United States Patent [19]

Hagenlocher et al.

[11] Patent Number: 5,256,926

[45] Date of Patent: Oct. 26, 1993

[54] ALTERNATING-CURRENT GENERATOR WITH STATOR CENTER LAMINATION AND METHOD FOR PRODUCING THE CENTER LAMINATION

[75] Inventors: Walter Hagenlocher, Stuttgart; Manfred Frister, Schwieberdingen, both of Fed. Rep. of Germany

[73] Assignee: Robert Bosch GmbH, Stuttgart, Fed. Rep. of Germany

[21] Appl. No.: 828,930

[22] PCT Filed: May 16, 1990

[86] PCT No.: PCT/DE90/00360

§ 371 Date: Jan. 31, 1992

§ 102(e) Date: Jan. 31, 1992

[87] PCT Pub. No.: WO91/02398

PCT Pub. Date: Feb. 21, 1991

[51] Int. Cl.$^5$ ............... H02K 1/16; H02K 15/02
[52] U.S. Cl. ............................ 310/259; 310/42; 310/254; 29/596
[58] Field of Search ............ 310/42, 217, 254, 259, 310/263; 29/596

[56] References Cited

U.S. PATENT DOCUMENTS

| | | | |
|---|---|---|---|
| 2,064,090 | 12/1936 | Sullivan et al. | 310/42 |
| 2,330,824 | 10/1943 | Granfield | 310/42 |
| 2,502,185 | 3/1950 | Thomas | 310/42 |
| 2,556,013 | 6/1951 | Thomas | 310/259 |
| 2,560,560 | 7/1951 | Doherty | 310/259 |
| 3,482,131 | 12/1969 | Lytle | 310/259 |
| 3,502,922 | 3/1970 | Welker | 310/172 |
| 3,834,013 | 9/1974 | Gerstle | 29/596 |
| 4,217,690 | 8/1980 | Morreale | 29/596 |
| 4,968,911 | 11/1990 | Denk | 310/259 |

*Primary Examiner*—Steven L. Stephan
*Assistant Examiner*—Thomas M. Dougherty
*Attorney, Agent, or Firm*—Michael J. Striker

[57] ABSTRACT

The alternating-current generator includes a housing having two end shields, a stator bundle and a rotor mounted in the housing so as to be rotatable in the stator bundle. The stator bundle includes two bundle halves and at least one center lamination between the bundle halves. The at least one center lamination is clamped between the end shields of the housing by bolts and has an outer diameter larger than an outer diameter of the stator bundles at least in the vicinity of the bolts so that the stator bundles are not under compression forces in the assembled generator. To facilitate economical manufacture of the stator bundle each of the center laminations is made from a plurality of individual interlocking segments. Each of the segments is advantageously circular arc shaped and provided with an interlocking device for connection with adjacent segments. The interlocking device can be a projecting portion at one end face of one segment which engages in a recess formed in an adjoining end face of an adjacent segment.

8 Claims, 2 Drawing Sheets

ALTERNATING-CURRENT GENERATOR WITH STATOR CENTER LAMINATION AND METHOD FOR PRODUCING THE CENTER LAMINATION

BACKGROUND OF THE INVENTION

The present invention relates to an alternating-current generator and, more particularly, to a three-phase alternating-current generator having a stator bundle with a center lamination. It also relates to a method of producing the center lamination of the stator bundle.

An alternating-current generator is known comprising a housing made of two end shields, a stator bundle with a center lamination received between the end shields and a rotor rotating in the stator bundle.

In alternating-current generators, and especially in three-phase generators such as dynamos for motor vehicles and the like, it is known (DE-OS 2 132 052) to construct the stator plate bundle with a center ring of greater diameter in such a why that this ring forms an outer annular flange for clamping the stator plate bundle between the two end shields of the generator. This ring is itself preferably a part of the stator plate, i.e. it is formed from one or more stator plate laminations which form the outer annular shape with their greater outer diameter for centering between the housing contact surfaces at both sides.

The stator center laminations are produced from one piece and are located between the two halves of the rest of the stator bundle. Further, it is preferable that eyes in the form of projections, e.g. four eyes, which serve as supporting surfaces for the end shields of the generator be uniformly distributed along the circumference of the center laminations. The entire stator bundle can then be riveted together and/or welded.

The eyes of the center laminations serving as centering means for the two end shields of the generator housing, which eyes are arranged along the circumference, make it possible to screw together the three structural component parts consisting of the A end shield, B end shield and stator bundle without the tightening forces of the screws guided through the eyes causing a deformation of the inner diameter of the stator. The two end shields in turn receive the bearing for the rotor shaft. In addition to efforts in other areas, it is necessary to support the rotor exactly in the center with respect to the stator to obtain a generator which is as quiet as possible. An important prerequisite for meeting this condition consists in that the center laminations of the stator bundle are aligned and placed between the remaining halves of the bundle in such a way that the coaxial deviation between the outer diameter of the center laminations and the inner diameter of the bundle as a whole is kept as small as possible. For this reason the center laminations must always be constructed in such a way that their outer diameter can be aligned so as to be exactly concentric to the inner diameter of the two remaining halves of the bundle.

The necessary degree of freedom for this is obtained in the center laminations, which are already necessarily constructed in one-piece for such an adjustment, in that the inner diameter of the center laminations is slightly greater than that of the two adjacent halves of the stator bundle; in other words, the inner diameter of the center laminations recedes slightly from the inner circle receiving the rotor. Further, the groove surfaces, i.e. the free surfaces remaining between the webs of the laminations, as well as the rivet hole diameter of the center laminations can be larger so that corresponding displacement is possible without leading to an overlapping of the areas of the stator bundle which are free as a result of the two halves of the bundle.

Obviously, the center laminations must therefore be in one piece or formed by a plurality of segments rigidly attached together, i.e. they cannot also comprise individual segments which can be loosely inserted into the bundle as is the case with the laminations forming the bundle halves which are known per se. This is because these segments would otherwise deflect inward due to the greater inner diameter of the center laminations during precise positioning in which the outer diameter is used as a point of reference.

However, one-piece laminations are very material-intensive, i.e. they require much base material since they must be stamped from a whole plate at considerable cost.

For this reason it is also already known (DE-PS 2 015 502) to produce annular laminations for electrodynamic machines by first starting from a planar plate of ferromagnetic work material and forming a pipe from this plate. This pipe is then cut into corresponding pipe pieces resulting in cylinders of given dimensions and with a thickness corresponding to the initial thickness of the plate. Every pipe piece is then made to bulge out between its end faces by a bulge deformation process and is then compressed by a force exerted in the axial direction to form a double-walled annular plate. During this compression of the bulged out pipe piece the inner and outer edges of the annular laminations formed in this way are simultaneously calibrated. It is then possible for the two laminations formed per se in every machining process to be separated from one another by undoing the bulged pipe piece at the outer edge. The grooves are then worked into the annular lamination at the inner edge. It is accordingly possible to produce laminations from one piece without wasting the entire inner plate of the lamination ring in the stamping process which is otherwise required. But it must be taken into account that the end face areas of the initial pipe piece must be given a smaller diameter and an average material layer must be given a greater diameter than the initial pipe diameter by the upsetting process, so that a flow of the material is necessary or different material thicknesses will result.

SUMMARY OF THE INVENTION

The object of the invention is to produce center laminations for the stator bundle of an alternating-current generator on the one hand so as to economize on material and accordingly on costs while avoiding stamping out from a round whole plate, but on the other hand to ensure that the center can be aligned as required for positioning lamination.

This object and others which will be made more apparent hereinafter are attained in an alternating-current generator, particularly a three-phase generator, such as a dynamo for a mobile unit, motor vehicle, railway vehicle and the like, comprising a housing made from two end shields, a stator bundle and a rotor mounted in the housing so as to be rotatable in the stator bundle, wherein the stator bundle includes two bundle halves and at least one center lamination located between the bundle halves, the at least one center lamination is clamped between the end shields by attachment means without compressing the bundle halves, and the outer diameter of the at least one center lamination is greater than that of the bundle halves at least in the vicinity of the attachment means, advantageously provided by threaded bolts passing through eyes in the periphery of the at least one center lamination.

According to the invention, in the generator of the above-described type each of the center laminations is made from a plurality of individual segments and adjacent individual segments have adjoining end faces and interlocking means at the adjoining end faces. The individual segments of each of the center laminations are advantageously interlocked to form a circular center lamination.

The interlocking means advantageously include a projecting portion on one of the adjoining end faces and a complementary recess on another adjoining end face. The projecting portion is shaped to fit and lock in the complementary recess to interlock the adjoining individual segments. The projecting portion can be substantially circular.

In the preferred embodiment of the invention individual segments are substantially circular arc shaped. The center lamination formed by interlocking the individual segments is substantially circular and the interlocking means are located at adjoining end faces of adjacent segments.

The invention meets the above object, and has the decisive advantage that it is possible, also for the center lamination, to stamp individual segments from a sheet metal strip so as to economize on material and then to combine the segments to form the interlocking center lamination by pressing them together by correspondingly shaped joining parts.

The invention therefore combines the advantages of a one-piece lamination with respect to handling during assembly with the material and cost saving advantages of a lamination consisting of segments which are stamped out of individual sheet metal strips.

It is especially advantageous to produce a center lamination from a plurality of circular arc shaped segments, e.g. two, three of four, the division being effected in such a way that identical segments are formed as far as possible.

The connection of the individual segments to form a comptet center lamination is then effected by positive-locking connecting means at the individual segment ends. For example, a circular projection at the front end of a segment can be pressed into a corresponding cut out portion at the adjacent front end of the other segment and the two segments thus connected to form a unit. This results in a kind of linking which, when correspondingly dimensioned, ensures a completely non-slip and rigid connection of the individual segments so that the adjusting positioning of the center lamination can also be reliably controlled during assembly.

The method for making the center lamination of the stator bundle includes stamping out the individual partially circular arc-shaped lamination segments from a sheet metal strip and placing the end faces of the individual partially circular lamination segments together so that their end faces can be connected by locking means provided on the end faces and connecting their end faces with each other in a positive-locking manner to form the one-piece center lamination. Adjoining end faces can be shaped so as to fit and lock together. For example, one end face can have a recess, while the other can have a projecting portion of for example with a circular cross-sectional head fitting in the recess.

BRIEF DESCRIPTION OF THE DRAWING

An embodiment example of the invention is shown in the drawing and is explained in more detail in the following description.

DESCRIPTION OF THE PREFERRED EMBODIMENT

The basic idea of the present invention consists in the production of the center laminations of a stator bundle by simply stamping out segments from planar sheet metal strips and subsequently connecting these segments in a interlocking manner to form a complete, rigid whole lamination.

Figure 1:
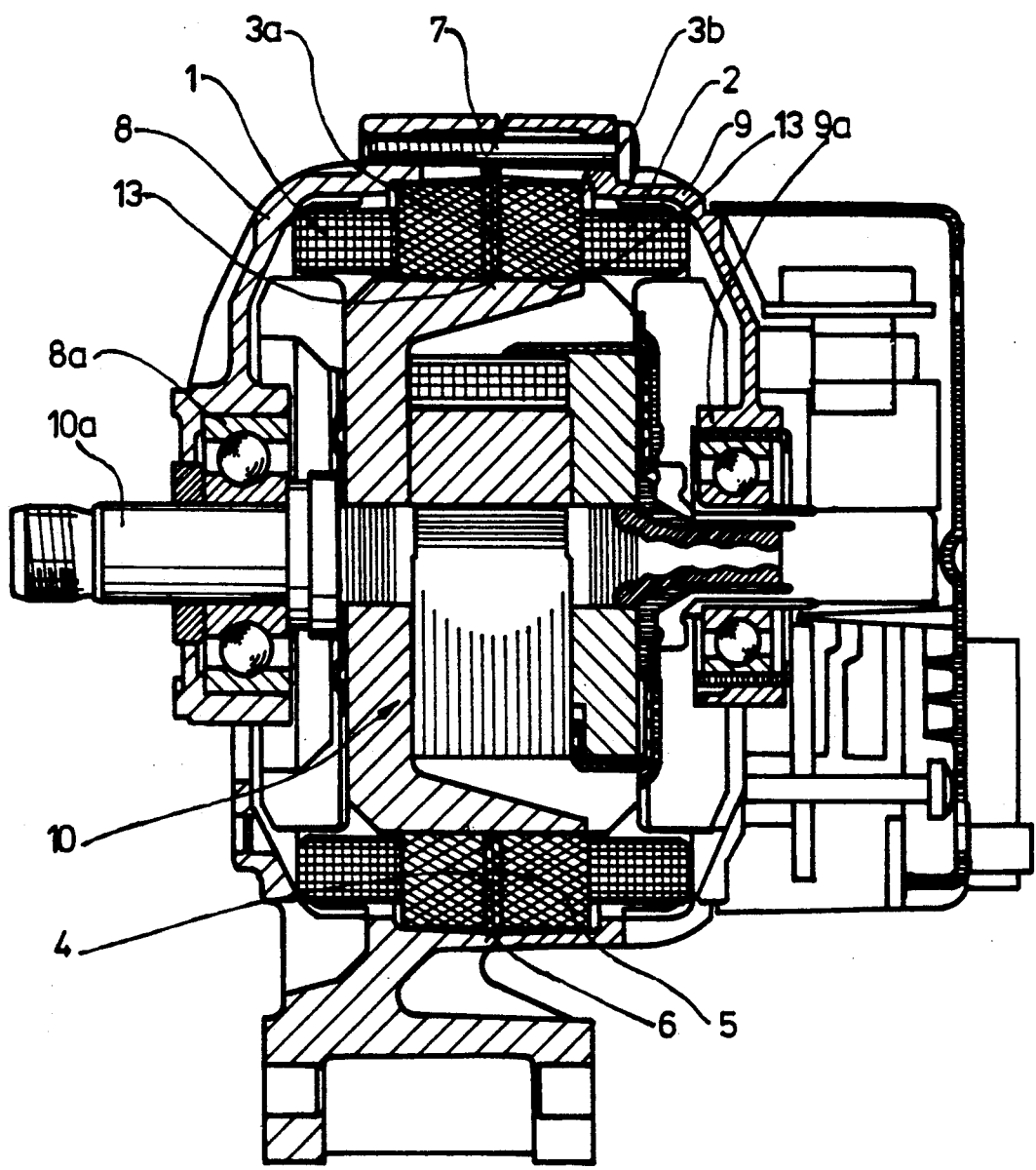
FIG. 1 is a longitudinal cross-sectional view through a three-phase generator acting as a dynamo for a motor vehicle according to a preferred embodiment of the present invention.

In FIG. 1, which also serves chiefly to clarify further the statements made above with respect to prior art and shows the arrangement of the center laminations in a three-phase generator, which is as dynamo for motor vehicles and the like, the stator 1 is arranged and centered at the inner circumference of the two end shields forming the housing of the three-phase generator, namely the A end shield 8 and the B end shield 9. The bearings 8a and 9a located opposite sides of the housing receive rotatably the rotor shaft 10a of the rotor 10 are received in receptacles of the two end shields. In addition to the winding 2, the stator 1 comprises two bundle halves 3a and 3b which receive between them the so-called center laminations designated here by 4 and 5. The outer diameter 6 of the center laminations 4 and 5 is larger than an outer diameter 6' of the bundle halves 3a and 3b. 7, e.g. four, at their circumference (see also FIG. 5).

As already mentioned in the beginning, the inner diameter 13" of the center laminations is greater than the inner diameter 13 of the two bundle halves 3a and 3b, so that their outer diameter 6 can be aligned very accurately so as to be concentric to the inner diameter 13' of the bundle halves during assembly, assuming that the center laminations 4 and 5 react as a unit.

Figure 2:
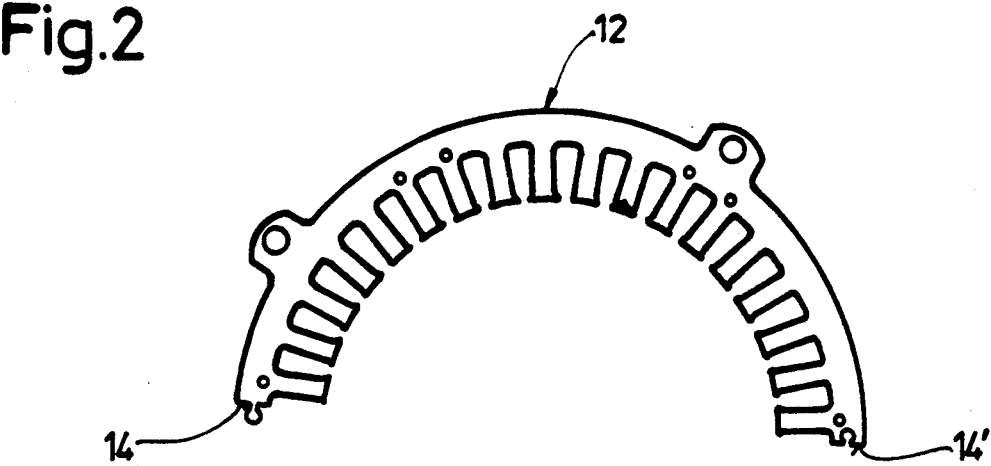
FIG. 2 shows a top view of a lamination segment for a center lamination according to the present invention in the form of a semicircular ring.

FIG. 2 shows a segment 12 which is stamped out of a planar sheet metal strip so as to economize on material. The number of segments ultimately combining to form a complete center lamination is not critical and a center lamination can also be produced from a plurality of segments, e.g. two, three, four, five or more. Accordingly it is also possible to arrange the individual segments in a correspondingly. Advantageous manner on the available sheet metal strip so that there is as little waste as possible.

The segments have interlocking at their front end areas 14 and 14' for connecting the segments 12 with one another in interlocking manner so that the full circle of every center lamination ca be formed. The interlocking means have a reciprocal locking character corresponding to a preferred embodiment example and therefore connect the individual segments.

In the embodiment shown in the drawing a projecting portion is formed at one front end 14 of the lamination segment 12 which comprises a tapered neck part 15 into a circular head part 16. In a correspondingly complementary manner, the other front end 14' in the shown embodiment example of the same lamination 12 has a corresponding recess 17 which is formed by a partially circular cavity 17a which opens outward in the transition bound by projecting on both sides. It is therefore possible by first placing the head part 16 over the cavity 17a and then pressing them together to connect adjoining front ends of lamination segments with one another and all existing segments continuously to form the complete center lamination. The two front end faces 14 and 14' of adjacent lamination segments are supported relative to one another so that by pressing the projecting portion with the circular head part into the corresponding recess the segments are rigidly and immovably connected with one another to form a unit, preferably in the manner of the "linking" shown in FIGS. 3 and 4. Naturally it is also possible to provide other connection means for the individual lamination segments which act in a positive-locking manner.

Figures 3, 4:
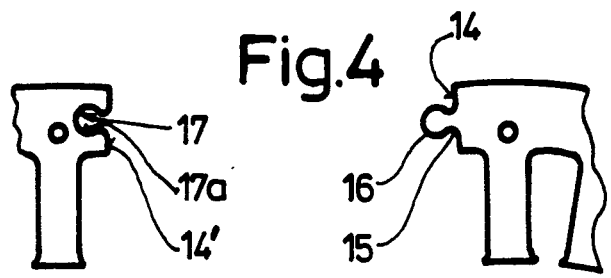
FIG. 3 shows the end area of a lamination segment with a cut out portion as recess for receiving the adjacent lamination end area shown in FIG. 4.
FIG. 4 shows the lamination end area with projecting protien.

It is also possible to arrange only projecting projections at one lamination segment and only cut out portions at the other lamination segment—but the form of realizing the lamination segments which is shown in FIGS. 2, 3 and 4 is preferred since in this way it is only necessary to produce one segment type.

Figure 5:
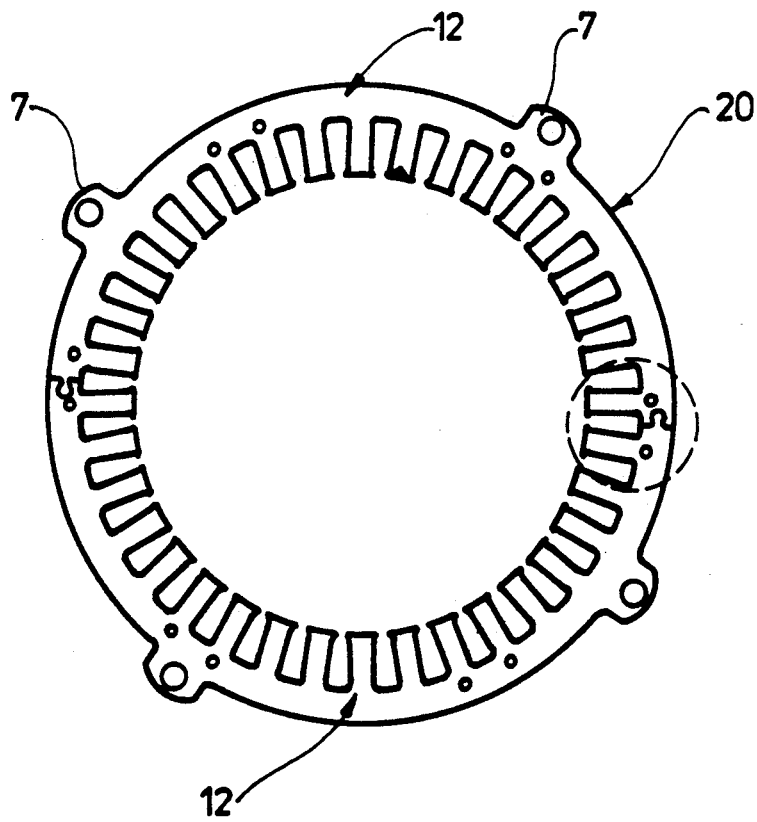
FIG. 5 is a top view of an assembled center lamination of a stator bundle, the center lamination comprises two individual segments and is pressed together by correspondingly shaped joining parts.

In every case the provided given number of lamination segments complement one another to form a complete center lamination 20 as shown in FIG. 5.

While the invention has been illustrated and described as embodied in an alternating current generator with stator center lamination and method for producing the center lamination, it is not intended to be limited to the details shown, since various modifications and structural changes may be made without departing in any way from the spirit of the present invention.

What is claimed is new and desired to be protected by Letters Patent is set forth in the appended claims.

We claim:

1. Alternating-current generator comprising a housing including two end shields, a stator bundle and a rotor mounted in the housing so as to be rotatable in the stator bundle, said stator bundle including two bundle halves and at least one center lamination between the bundle halves, the at least one center lamination being clamped between the end shields of the housing by attachment means, and wherein said at least one center lamination has an outer diameter larger than an outer diameter of the stator bundles at least in the vicinity of the attachment means, each of said at least one center laminations being made from a plurality of individual interlocking segments, said interlocking segments being provided with interlocking means for interlocking to form each of said at least one center laminations.

2. Alternating-current generator as defined in claim 1, wherein adjacent segments have adjoining end faces and the interlocking means includes a projecting portion extending from one of the adjoining end faces and a complementary recess on another of the adjoining end faces, the projecting portion being shaped to fit and lock n the complementary recess to interlock said adjacent segments.

3. Alternating-current generator as defined in claim 2, wherein the individual segments are substantially circular arc shaped and each of the at least one center laminations formed by interlocking the individual segments is substantially circular.

4. Alternating-current generator as defined in claim 1 and comprising a three-phase generator.

5. Alternating-current generator as defined in claim 1 and comprising a dynamo.

6. Method of producing a center lamination of a stator bundle of an alternating-current generator comprising:

a. stamping out a plurality of individual segments from a strip made of sheet metal, each of the individual segments being circular arc shaped, each of said segments having end faces and interlocking means at said end faces by which adjacent segments can be interlocked to form a circular center lamination; and b. interlocking the individual segments to form the center lamination.

7. Method as defined in claim 6, further comprising dividing the sheet metal strip into the individual segments so as to economize on sheet metal and to form the interlocking means.

8. Method as defined in claim 6, further comprising forming a recess in one of the end faces of each of the individual segments and forming a projecting portion in another of the end faces thereof, said projecting portion being formed to fit in said recess and forming together with the recess at least a portion of the interlocking means.

* * * * *